3,265,718
17α-(3-HYDROXY-1-PROPYNYL) OR 17α-(3-HY-
DROXY-1-PROPENYL) SUBSTITUTED ARO-
MATIC STEROIDS
Robert G. Christiansen, Schodack, N.Y., assignor to
Sterling Drug Inc., New York, N.Y., a corporation
of Delaware
No Drawing. Filed Sept. 13, 1965, Ser. No. 487,081
Claims priority, application Canada, Oct. 27, 1964,
915,017
18 Claims. (Cl. 260—397.5)

This application is a continuation-in-part of the co-pending Christiansen application, Serial No. 328,212, filed December 5, 1963, now abandoned.

This invention relates to new aromatic steroid compounds, and in particular is concerned with ring A-aromatic, 3,17β-dihydroxy steroids bearing in the 17α-position a 3-hydroxy-1-propynyl or 3-hydroxy-1-propenyl group; and with ethers and esters of said steroids.

A preferred aspect of the invention is concerned with compounds having the following general formula:

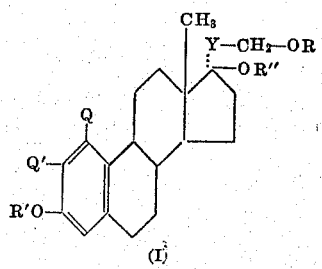

wherein Q is hydrogen or methyl; Q' is hydrogen, methyl or lower-alkoxy; R and R' are hydrogen, lower-alkyl, lower-alkenyl, cycloalkyl of 5–6 ring members, phenyl, phenyl-lower-alkyl, phenyl-lower-alkenyl, lower-carboxylic, acyl or nitro; R" is hydrogen, lower-alkyl, lower alkenyl, cycloalkyl of 5–6 ring members, phenyl-lower-alkyl, phenyl-lower-alkenyl, lower-carboxylic acyl, or nitro; and Y is C≡C or CH=CH; lower-carboxylic acyl in each instance having 1 to 12 carbon atoms and a molecular weight less than 250. Also included within the scope of the invention are compounds of the above formula having an additional double bond in the 6,7-position, the 7,8-position or the 9,11-position as well as compounds having two additional double bonds, in the 6,7- and the 8,9-positions.

The term "lower-alkoxy" used in defining Q' in the above formula stands for an alkoxy group of from 1 to 6 carbon atoms, thus including such groups as methoxy, ethoxy, propoxy, isopropoxy, n-butoxy, n-hexoxy, and the like.

The term "lower-alkyl" used in defining R, R' and R" in the above formula stands for an alkyl group of from 1 to 10 carbon atoms, thus including such groups as methyl, ethyl, propyl, isopropyl, butyl, pentyl, hexyl, heptyl, octyl, nonyl, decyl, and the like.

The term "lower-alkenyl" used in defining R, R' and R" in the above formula stands for an alkenyl group of from 3 to 10 carbon atoms, thus including such groups as allyl, 2-butenyl, 3-butenyl, 3-pentenyl, 4-octenyl, 5-decenyl, and the like.

The term "cycloalkyl of 5–6 ring members" used in defining R, R' and R" in the above formula stands for cyclopentyl, cyclohexyl or lower-alkylated derivatives thereof, e.g., 3-methylcyclopentyl, 4-ethylcyclohexyl, 3,4-dimethylcyclohexyl, and the like.

The terms "phenyl-lower-alkyl" and "phenyl-lower-alkenyl" used in defining R, R' and R" in the above formula stand for lower-alkyl and lower-alkenyl groups of the type described hereinabove substituted by a phenyl group, thus including such groups as benzyl, 1-phenylethyl, 2-phenylethyl, 4-phenylbutyl, cinnamyl, 4-phenyl-2-butenyl, and the like. The phenyl group can, if desired be further substituted by inert substituents such as lower-alkyl, lower-alkoxy and halogen.

When R, R' or R" stand for lower-carboxylic acyl groups, preferred classes of acyl groups include lower-alkanoyl radicals, preferably having from 1 to 12 carbon atoms, e.g., formyl, acetyl, propionyl, butyryl, isobutyryl, caproyl, heptanoyl octanoyl, dodecanoyl, trimethylacetyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; benzoyl; naphthalenecarbonyl; phenyl-lower-alkanoyl or -alkenoyl radicals, such as phenylacetyl, β-phenylpropionyl, cinnamoyl, and the like; phenyloxy-lower-alkanoyl radicals, such as p-chlorophenoxyacetyl; pyridylcarbonyl, e.g., nicotinoyl and isonicotinoyl; carbanilyl; and thiocarbanilyl. In aryl radicals containing a phenyl group or a naphthyl group, the aromatic ring can be further substituted by any number and kind of substituents inert under the reaction conditions used, including lower-alkyl, for example p-tolyl; lower-alkoxy, for example 3,4-dimethoxyphenyl; halogen (including fluorine, chlorine, bromine and iodine), for example 2-bromophenyl; and nitro, for example p-nitrophenyl. The lower-alkyl and lower-alkoxy groups can have from one to four carbon atoms.

The compounds of the invention where Y is C≡C are prepared by treating a 17-oxo compound of the formula

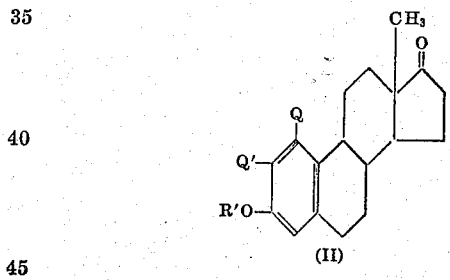

or the 6,7-dehydro, 7,8-dehydro, 9,11-dehydro or 6,7;8,9-bis-dehydro analogs thereof, with an alkali metal derivative of a compound of the formula HC≡CCH₂OR, wherein Q and Q' have the meanings given hereinabove, and R and R' are hydrogen, lower-alkyl, lower-alkenyl, cyclo-alkyl of 5–6 ring members, phenyl, phenyl-lower-alkyl or phenyl-lower-alkenyl; and hydrolyzing the reaction mixture. The reaction of the 17-oxo steroid and alkali metal derivative takes place at ordinary temperatures in an inert anhydrous solvent.

The foregoing process produces a compound of Formula I (or the dehydro analogs thereof) wherein R and R' are each either hydrogen, lower-alkyl, lower-alkenyl, cycloalkyl of 5–6 ring members, phenyl, phenyl-lower-alkyl or phenyl-lower-alkenyl; and R" is hydrogen. In the event that compounds wherein one or more of R, R' and R" are lower-carboxylic acyl groups are desired, they are produced from the corresponding free carbinols by esterification reactions, for example, by treating the carbinol with the appropriate acid anhydride or acid halide in the presence of pyridine. The primary hydroxy group (R=H) and the phenolic hydroxy group (R'=H) are readily esterified at room temperature. Esterification of the primary hydroxy group (R=H) can also be carried out by heating the carbinol with a free acid, especially a lower-aliphatic carboxylic acid. In this way the primary hydroxy group (R=H) can be esterified without esterifying the phenolic hydroxy group (R'=H).

Esterification of the tertiary hydroxy group (R''=H) is effected only under forcing conditions (extended heating). Accordingly, selective esterification of the primary hydroxy group (R=H) can be performed. Conversely, the diesters (R and R''=acyl) can be selectively saponified, the primary acyloxy group being more readily hydrolyzed, thus leading to compounds where the tertiary hydroxy group (R''=H) only is esterified.

Nitrate esters (R and/or R'=$NO_2$) are prepared by reacting the free carbinols with a mixture of acetic anhydride and nitric acid.

Etherification of compounds of Formula I having free hydroxy groups where the entering R group is lower-alkyl, lower-alkenyl, cycloalkyl of 5–6 ring members, phenyl-lower-alkyl or phenyl-lower-alkenyl can be effected by heating an alkali metal derivative of a free carbinol with an appropriate organic halide R–X, where X is chlorine, bromine or iodine.

The compounds of Formula I wherein Y is CH=CH are prepared by partial hydrogenation of the compounds of Formula I wherein Y is C≡C. The hydrogenation can be carried out catalytically, in which case the cis-isomer is obtained. A preferred catalyst is palladium hydroxide on strontium carbonate. The hydrogenation can also be carried out with lithium aluminum hydride, in which case the trans-isomer is obtained.

The structures of the compounds of the invention were established by the modes of preparation, by elementary analyses, and by their chemical and physical properties, including their behavior in thin-layer chromatography.

Biological evaluation of the products of the invention has shown that they possess hypocholesteremic and estrogenic activity with the former activity predominating. The known hypocholesteremic agents possess concomitant estrogenic activity which is usually unwanted because of the feminizing side-effects produced. In the compounds of the present invention there is a marked separation in the hypocholesteremic and estrogenic activity, the latter being greatly reduced. Effective dose levels range from 1 to 50 mg./kg. and the compounds can be formulated and administered to animal organisms in the same manner as other steroidals hormones.

The following examples will further illustrate the invention without the latter being limited thereby.

EXAMPLE 1

*3-methoxy-17α-(3-hydroxy-1-propynyl)- 1,3,5(10)-estratrien-17β-ol*

A mixture of 3.67 g. (0.160 mole) of lithium amide, 4.48 g. (0.080 mole) of propargyl alcohol and 200 ml. of dioxane was heated at reflux under nitrogen for two hours. There was then added 11.38 g. (0.040 mole) of estrone methyl ether, and the mixture was refluxed for two hours longer. The reaction mixture was cooled to room temperature, 20 ml. of acetic acid added and the mixture allowed to stand overnight. The volatile solvent was then removed in vacuo on a steam bath, and the residual material was partitioned between 300 ml. of methylene dichloride and 500 ml. of water. The organic layer was separated, dried over anhydrous sodium sulfate, filtered and concentrated to a volume of 100 ml. The product which separated was recrystallized from a methanol-ethyl acetate mixture to give 3-methoxy-17α-(3-hydroxy-1-propynyl)-1,3,5(10)-estratrien-17β-ol in the form of colorless plates, M.P. 174.0–175.4° C. (corr.); $[\alpha]_D^{25}$=—5.9° (1% in chloroform).

3 - methoxy - 17α - (3 - hydroxy - 1 - propynyl) - 1,3, 5(10)-estratrien-17β-ol was found to possess hypocholesteremic activity (11 mg./kg./day, dose required to reduce serum cholesterol by 33% in rats) and slight estrogenic activity ($ED_{50}$=170 mg./kg./day).

EXAMPLE 2

*3-methoxy-17α-(3-hydroxy-1-propynyl)-1,3,5(10)- estratrien-17β-ol*

Potassium (83 g., 2.12 g. at.), cut into convenient sized lumps was added with stirring during approximately ten minutes to 1.6 liters of liquid ammonia contained in a 5-liter, 3-necked flask equipped with a stirrer and a condenser cooled with solid carbon dioxide. The mixture was cooled in a solid carbon dioxide-isopropyl alcohol bath, and propargyl alcohol (124 ml., 2.14 moles) was added dropwise with stirring over a period of one hour, followed by 300 g. (1.055 moles) of estrone methyl ether introduced portionwise over a period of ten minutes. The condenser and cooling bath were then removed and the reaction mixture stirred for two hours. After this period very gentle steam was applied to the flask to hasten the evaporation of the ammonia and after one hour the reaction temperature reached 0° C. The steam was turned off and stirring continued for an additional hour and one-half, during which time the temperature rose to 17° C. The reaction mixture was poured into 6 liters of ice water with stirring, and concentrated hydrochloric acid was slowly added until the suspension was just weakly basic. The mixture was then diluted with an additional 4 liters of cold water and stirring was continued for an additional half hour. The resulting pale cream colored product was collected by filtration, slurried once with water and dried overnight. The dried product was stirred with 750 ml. of methylene dichloride at 0° C. for one-half hour, then collected and washed with an additional 750 ml. of cold methylene dichloride, to give, after drying, 309 g. of 3-methoxy-17α-(3-hydroxy-1-propynyl)-1,3-,5(10)-estratrien-17β-ol, M.P. 172–173° C. (uncorr.).

EXAMPLE 3

*3-methoxy-17α-(3-acetoxy-1-propynyl)-1,3,5(10)- estratrien-17β-ol*

A mixture of 3.00 g. of 3-methoxy-17α-(3-hydroxy-1-propynyl)-1,3,5(10)-estratrien-17β-ol (Example 1), 20 ml. of acetic anhydride and 20 ml. of pyridine was stirred for seventeen hours at room temperature. The reaction mixture was added to 400 ml. of ice water and the solid product was collected by filtration, washed with water and dried. The product was recrystallized from an acetone-cyclohexane mixture to give 2.82 g. of 3-methoxy-17α-(3-acetoxy-1-propynyl)-1,3,5(10)-estratrien-17β-ol in the form of colorless prisms, M.P. 128.0–129.5° C. (corr.); $[\alpha]_D^{25}$=—8.1° (1% in chloroform).

By replacing the acetic anhydride in the foregoing preparation by a molar equivalent amount of propionic anhydride, caproyl chloride, succinic anhydride, β-cyclopentylpropionic anhydride, cinnamoyl chloride, naphthalene-1-carboxylic acid chloride, nicotinoyl chloride, or p-chlorophenoxyacetic anhydride there can be obtained, respectively, 3-methoxy-17α-(3-propionoxy-1-propynyl)-1,3,5(10)- estratrien-17β-ol,
light beige prisms, M.P. 75.2–76.8° C. (corr.) (from acetone-cyclohexane),
$[\alpha]_D^{25}$=—8.1° (1% in chloroform),
3-methoxy-17α-(3-caproyloxy-1-propynyl)-1,3,5(10)- estratrien-17β-ol,
3-methoxy-17α-[3-(β-carboxypropionoxy)-1-propynyl])- 1,3,5(10)-estratrien-17β-ol,
3-methoxy-17α-[3-(β-cyclopentylpropionoxy)-1- propynyl]-1,3,5(10)-estratrien-17β-ol,
3-methoxy-17α-(3-cinnamoyloxy-1-propynyl)- 1-propynyl]-1,3,5(10)-estratrien-17β-ol,
1,3,5(10)-estratrien-17β-ol,
3-methoxy-17α-[3-(naphthalenecarbonyloxy)-
3-methoxy-17α-(3-nicotinoyloxy-1-propynyl)- 1,3,5(10)-estratrien-17β-ol, or 3-methoxy-17α-[3-(p-chlorophenoxyacetoxy)-1-propynyl]-1,3,5(10)-estratrien-17β-ol.

By adding nitric acid to the reaction mixture of Example 3 above there can be obtained 3-methoxy-17-(3'-hydroxy-1'-propynyl) - 1,3,5(10)-estratrien-17β-ol 3'-nitrate, colorless prisms, M.P. 107.0–107.8° C. (corr.), $[\alpha]_D^{25} = -7.1°$ (1% in chloroform).

By adding formic acid to the reaction mixture of Example 3 above there can be obtained 3-methoxy-17α-(3-formyloxy-1-propynyl) - 1,3,5(10)-estratrien - 17β-ol, colorless prisms, M.P. 107.6–108.8° C. (corr.), $$[\alpha]_D^{25} = -6.4°$$

(1% in chloroform).

By heating the reaction mixture in Example 3 above at reflux for about eighteen hours there can be obtained 3-methoxy-17β-acetoxy-17α-(3-acetoxy-1-propynyl)-1,3,5-(10)-estratrien, as a yellow-brown glass, $[\alpha]_D^{25} = -19.8°$ (1% in chloroform).

3-methoxy - 17α-(3-hydroxy-1-propynyl) - 1,3,5(10)-estratrien-17β-ol can be caused to react with phenyl isocyanate or phenyl isothiocyanate to afford, respectively, 3-methoxy-17α(3-carbanilyloxy-1-propynyl)-
  1,3,5(10)-estratrien-17β-ol or
3-methoxy-17α-(3-thiocarbanilyloxy-1-propynyl)-
  1,3,5(10)-estratrien-17β-ol.

EXAMPLE 4

17α-(3-hydroxy-1-propynyl) - 1,3,5(10)-estratriene - 3, 17β-diol was prepared from 5.41 g. of estrone, 3.13 of potassium and 4.54 g. of propargyl alcohol in liquid ammonia according to the procedure described above in Example 2. The crude product was acetylated with 32 ml. of acetic anhydride in 32 ml. of pyridine, eighteen hours at room temperature, and the resulting 3-acetoxy-17α-(3-acetoxy-1-propynyl) - 1,3,5(10)-estratrien-17β-ol was dissolved in methylene dichloride and chromatographed on a column of 240 g. of alumina. The column was eluted successively with pentane-ether, ether, and ether-methanol. The product brought out by ether-methanol 95:5 was the deacetylated compound, 17α-(3-hydroxy-1-propynyl) - 1,3,5(10)-estratriene - 3,17β-diol, colorless prisms, M.P. 218.0–220.0° C. (corr.);

$$[\alpha]_D^{25} = -18.4°$$

(1% in chloroform).

17α - (3 - hydroxy - 1 - propynyl) - 1,3,5(10) - estratriene-3,17β-diol can be caused to react with propionic anhydride, caproyl chloride, succinic anhydride, β-cyclopentylpropionic anhydride, benzoyl chloride, p-nitrobenzoyl chloride or cinnamoyl chloride, in the presence of pyridine, to give, respectively, 3-propionoxy-17α-(3-propionoxy-1-propynyl)-1,3,5(10)-
  estratrien-17β-ol,
3-caproyloxy-17α-(3-caproyloxy-1-propynyl)-1,3,5(10)-
  estratrien-17β-ol,
3-(β-carboxypropionoxy)-17α-[3-(β-carboxypropionoxy)-1-propynyl]-1,3,5(10)-estratrien-17β-ol,
3-(β-cyclopentylpropionoxy)-17α-[3-(β-cyclopentylpriopionoxy)-1-propynyl]-1,3,5(10)-estratrien-17β-ol,
3-benzoyloxy-17α-(3-benzoyloxy-1-propynyl)-1,3,5(10)-
  estratrien-17β-ol,
3-(p-nitrobenzoyloxy)-17α-[3-(p-nitrobenzoyloxy)-1-propynyl]-1,3,5(10)-estratrien-17β-ol, or
3-cinnamoyloxy-17α-(3-cinnamoyloxy-1-propynyl)-1,3,5(10)-estratrien-17β-ol.

17α - (3 - hydroxy - 1 - propynyl) - 1,3,4(10) - estratriene-3,17β-diol when heated at reflux with a mixture of acetic anhydride and pyridine for about eighteen hours can be converted to 3,17β-diacetoxy-17α-(3-acetoxy-1-propynyl)-1,3,5(10)-estratriene.

EXAMPLE 5

3 - heptyloxy - 17α - (3 - hydroxy - 1 - propynyl) - 1,3,5(10)-estratrien-17β-ol was prepared from 7.37 g. of estrone n-heptyl ether, 4.54 g. of propargyl alcohol and 3.13 g. of potassium in 100 ml. of liquid ammonia according to the procedure described above in Example 2. The product was obtained in the form of colorless plates, M.P. 139.6–140.4° C. (corr.) when recrystallized from methylene dichloride containing about 5% acetonitrile; $[\alpha]_D^{25} = -3.5°$ (1% in chloroform).

By replacing the estrone n-heptyl ether in the foregoing preparation by a molar equivalent amount of estrone n-decyl ether there can be obtained 3-(n-decyl)oxy-17α-(3-hydroxy-1-propynyl)1,3,5(10)-estratrien-17β-ol.

EXAMPLE 6

3 - cyclopentyloxy - 17α - (3 - hydroxy - 1 - propynyl)-1,3,5(10)-estratrien-17β-ol was prepared from 6.77 g. of estrone cyclopentyl ether, 4.54 g. of propargyl alcohol and 3.13 g. of potassium in 100 ml. of liquid ammonia according to the procedure described above in Example 2. The product was obtained in the form of colorless plates, M.P. 190.8–192.0° C. (corr.), when recrystallized from ethyl acetate: $[\alpha]_D^{25} = +4.2°$ (1% in chloroform).

By replacing the estrone cyclopentyl ether in the foregoing preparation by a molar equivalent amount of estrone cyclohexyl ether or estrone 4-methylcyclohexyl ether there can be obtained, respectively, 3-cyclohexyloxy-17α-(3-hydroxy-1-propynyl)-1,3,5(10)-
  estratrien-17β-ol or
3-(4-methylcyclohexyloxy)-17α-(3-hydroxy-1-propynyl)-
  1,3,5(10)-estratrien-17β-ol.

By replacing the estrone cyclopentyl ether in the foregoing preparation by a molar equivalent amount of estrone allyl ether, estrone benzyl ether or estrone cinnamyl ether, there can be obtained, respectively, 3-allyloxy-17α-(3-hydroxy-1-propynyl)-1,3,5(10)-estratrien-17β-ol, tan plates, M.P. 137.0–139.9° C. (corr.);
3-benzyloxy-17α-(3-hydroxy-1-propynyl)-1,3,5(10)-
  estratrien-17β-ol; or
3-cinnamyloxy-17α-(3-hydroxy-1-propynyl-1,3,5(10)-
  estratrien-17β-ol.

EXAMPLE 7

3 - methoxy - 17α - (3 - methoxy - 1 - propynyl) - 1,3,5(10)-estratrien-17β-ol was prepared from 5.69 g. of estrone methyl ether, 5.68 g. of methyl 2-propynyl ether and 3.13 g. of potassium in 100 ml. of liquid ammonia according to the procedure described above in Example 2. The crude product was dissolved in a methylene dichloride-pentane mixture and chromatographed on a column of 200 g. of alumina. The column was eluted successively with pentane, pentane-ether and ether, the last bringing out the desired product, 3-methoxy-17α-(3-methoxy-1-propynyl)-1,3,5(10)-estratrien-17β-ol, M.P. 89.0–91.2° C. (corr.) when recrystallized from cyclohexane; $[\alpha]_D^{25} = -7.4°$ (1% in chloroform).

By replacing the methyl 2-propynyl ether in the procedure of Example 7 above by a molar equivalent amount of phenyl 2-propynyl ether, there can be obtained 3-methoxy - 17α - (3 - phenoxy - 1 - propynyl) - 1,3,5(10)-estratrien-17β-ol, beige prisms, M.P. 103.0–107.0° C. (corr.), when recrystallized from acetonitrile;

$$[\alpha]_D^{25} = -13.1°$$

(1% in chloroform).

By replacing the methyl 2-propynyl ether in the foregoing preparation by a molar equivalent amount of n-decyl 2-propynyl ether, cyclopentyl 2-propynyl ether or cyclohexyl 2-propynyl ether there can be obtained, respectively, 3-methoxy-17α-[3-(n-decyloxy)-1-propynyl]-1,3,5(10)-
  estratrien-17β-ol, 3-methoxy-17α-(3-cyclopentyloxy-1-propynyl)-1,3,5(10)-estratrien-17β-ol, or 3-methoxy-17α-(3-cyclohexyloxy-1-propynyl)-1,3,5(10)-estratrien-17β-ol.

By replacing the methyl 2-propynyl ether in the foregoing preparation by a molar equivalent amount of allyl 2-propynyl ether, benzyl 2-propynyl ether or cinnamyl 2-propynyl ether, there can be obtained, respectively, 3-methoxy-17α-(3-allyloxy-1-propynyl)-1,3,5(10)-estratrien-17β-ol, 3-methoxy-17α-(3-benzyloxy-1-propynyl)-1,3,5(10)-estratrien-17β-ol, or 3-methoxy-17α-(3-cinnamyloxy-1-propynyl)-1,3,5(10)-estratrien17β-ol.

EXAMPLE 8

3 - methoxy - 17α - (3 - hydroxy - 1 - propynyl) - 1,3,5(10),6 estratetraen-17β-ol was prepared from 5.65 g. of 6-dehydroestrone methyl ether, 4.54 g. of propargyl alcohol and 3.13 g. of potassium in 100 ml. of liquid ammonia according to the procedure described above in Example 2. The product was obtained in the form of colorless plates, M.P. 168.2–169.0° C. (corr.), when recrystallized from ethyl acetate, $[\alpha]_D^{25} = -300.10$ (1% in chloroform).

EXAMPLE 9

3 - methoxy - 17α - (3 - hydroxy - 1 - propynyl)-1,3,5(10),6,8-estrapentaen-17β-ol was prepared from 5.61 g. of equilenin methyl ether, 4.54 g. of propargyl alcohol and 3.13 g. of potassium in 100 ml. of liquid ammonia according to the procedure described above in Example 2. The product was obtained in the form of beige prisms, M.P. 181.8–183.4° C. (corr.), when recrystallized from ethyl acetate; $[\alpha]_D^{25} = -150.6°$ (1% in chloroform).

In a similar manner, 1-methylestrone methyl ether or 9(11)-dehydroestrone methyl ether was reacted with propargyl alcohol and potassium in liquid ammonia to give, respectively 3 - methoxy - 1 - methyl - 17α - (3-hydroxy - hydroxy - 1 - propynyl) - 1,3,5(10) - estratrien-17β-ol, M.P. 135.0–137.0° C. (corr.), $[\alpha]_D^{25} = +40.5°$ (1% in cloroform); and 3-methoxy-17α-(3-hydroxy-1-propynyl) - 1,3,5(10),9(11) - estratetraen - 17β - ol, M.P. 167.0–181.8° C. (corr.), $[\alpha]_D^{25} = +94.0°$ (1% in chloroform).

In a similar manner, 2-methoxyestrone methyl ether, 2-methylestrone methyl ether, or equilin methyl ether, can be reacted with propargyl alcohol and potassium in liquid ammonia to give, respectively, 2,3-dimethoxy-17α - (3 - hydroxy - 1 - propynyl) - 1,3,5(10) - estratrien-17β - ol, 3 - methoxy - 2 - methyl - 17α - (3 - hydroxy-1-propynyl)-1,3,5(10)-estratrien-17β-ol, or 3-methoxy-17α - (3 - hydroxy - 1 - propynyl) - 1,3,5(10),7 - estratetraen-17β-ol.

EXAMPLE 10

*3-methoxy-17α-[3-(3-phenylpropionyloxy)-1-propynyl]-1,3,5(10)-estratrien-17β-ol*

3-phenylpropionyl chloride (137 g., 0.81 mole) was added dropwise to a stirred solution of 250 g. (0.735 mole) of 3 - methoxy - 17α - (3 - hydroxy - 1 - propynyl)-1,3,5(10)-estratrien-17β-ol at 5–10° C. under anhydrous conditions. The reaction mixture was stirred at 5–10° C. for one-half hour and then at room temperature for three hours. The reaction mixture was added to 10 liters of water and the aqueous mixture extracted with 3 liters of ether. The ether extracts were washed with dilute hydrochloric acid and aqueous sodium bicarbonate, and the aqueous washes were back-extracted with 3 liters of ether. The combined ether extracts were dried over anhydrous sodium sulfate and then concentrated in vacuo. The residue was dissolved in 1760 ml. of hot methanol and the solution cooled to room temperature, filtered and seeded. Upon cooling to 0° C. there separated 261 g. of 3 - methoxy - 17α - [3 - (3 - phenylpropionyloxy)-1 - propynyl] 1,3,5(10) estratrien - 17β - ol, M.P. 92.6–95.4° C. (corr.), $[\alpha]_D^{25} = -3.1°$ (1% in chloroform).

By analogous procedures using the appropriate acid chloride were obtained the following esters:

3 - methoxy - 17α - [3 - benzoyloxy - 1 - propynyl]-1,3,5(10)-estratrien-17β-ol, colorless blades, M.P. 122.0–123.8° C. (corr.) (from methylene dichloride-acetonitrile), $[\alpha]_D^{25} = -7.6°$ (1% in chloroform).

3 - methoxy - 17α - [3 - (p - methoxybenzoyloxy)-1 - propynyl] - 1,3,5(10) - estratrien - 17β - ol, M.P. 142.4–143.4° C. (corr.) (from methylene dichloride-acetonitrile), $[\alpha]_D^{25} = -5.4°$ (1% in chloroform).

3 - methoxy - 17α - [3 - (p - chlorobenzoyloxy) - 1-propynyl] - 1,3,5(10) - estratrien - 17β - ol, M.P. 114.6–116.0° C. (corr.) (from methylene dichloride-acetonitrile), $[\alpha]_D^{25} = -3.2°$ (1% in chloroform).

3 - methoxy - 17α - [3 - (p - methylbenzoyloxy) - 1-propynyl] - 1,3,5(10 - estratrien - 17β - ol, colorless rods, M.P. 124.6–126.0° C. (corr.) (from acetonitrile)

$$[\alpha]_D^{25} = -6.9°$$

(1% in cloroform).

3 - methoxy - 17α - [3 - (p - fluorobenzoyloxy) - 1-propynyl] - 1,3,5(10) - estratrien - 17β - ol, colorless prisms, M.P. 128.6–131.0° C. (corr.) (from acetonitrile), $[\alpha]_D^{25} = -6.1°$ (1% in chloroform).

3 - methoxy - 17α - [3 - (p - nitrobenzoyloxy) - 1-propynyl] - 1,3,5(10) - estratrien - 17β - ol, cream-colored powder, M.P. 138.5–139.2° C. (corr.) (from methylene dichloride-acetonitrile), $[\alpha]_D^{25} = -4.5°$ (1% in chloroform).

3 - methoxy - 17α - [3 - (3 - pyridylcarbonyloxy)-1 - propynyl] - 1,3,5(10) - estratrien - 17β - ol, beige prisms, M.P. 160.0–161.2° C. (corr.) (from methylene dichloride-acetonitrile), $[\alpha]_D^{25} = -8.6°$ (1% in chloroform).

3 - methoxy - 17α - (3 - trimethylacetoxy - 1 - propynyl) - 1,3,5(10) - estratrien - 17β - ol, colorless rods, M.P. 112.2–113.6° C. (corr.) (from methylene dichloride-acetonitrile), $[\alpha]_D^{25} = -5.1°$ (1% in chloroform).

3 - methoxy - 17α - [3 - (p - dimethylaminobenzoyloxy) - 1 - propynyl] - 1,3,5(10) - estratrien - 17β - ol, colorless prisms, M.P. 168.6–169.8° C. (corr.) (from ethyl acetate), $[\alpha]_D^{25} = -7.8°$ (1% in chloroform).

3 - methoxy - 17α - {3 - [2 - (p - chlorophenoxy) - 2-methyl - propionoyloxy] - 1 - propynyl} - 1,3,5(10)-estratrien - 17β - ol, amorphous amber glass, $$[\alpha]_D^{25} = -5.8°$$

(1% in chloroform).

EXAMPLE 11

*3,17β-dimethoxy-17α-(3-methoxy-1-propynyl)-1,3,5(10)-estratriene*

A mixture of 10.21 g. of 17α-(3-hydroxy-1-propynyl)-1,3,5(10)-estratriene-3,17β-diol, 4.10 g. of sodium hydride, 42.6 g. of methyl iodide and 105 ml. of dimethylsulfoxide was stirred at room temperature for twenty-seven hours. The material isolated from the reaction mixture was chromatographed on a column of silica gel and eluted with pentane-ether (85:15). The product was recrystallized from a methylene dichloridecyclohexane mixture to give 3,17β - dimethoxy - 17α - (3 - methoxy-1-propynyl)-1,3,5(10)-estratriene, colorless needles, M.P. 77.8–78.2° S. (corr.), $[\alpha]_D^{25} = -13.4°$ (1% in chloroform).

EXAMPLE 12

*17α-(3-acetoxy-1-propynyl)1,3,5(10)-estratriene-3,17β-diol*

A mixture of 9.79 g. of 17α-(3-hydroxy-1-propynyl)-1,3,5(10)-estratriene-3,17β-diol and 200 ml. of glacial acetic acid was heated at reflux for twenty-four hours. The material isolated from the reaction mixture was chromatographed on a column of silica gel and eluted with pentane-ether (60:40). The product was recrystallized from an acetone-acetonitrile mixture to give 17α-(3-acetoxy - 1 - propynyl) - 1,3,5(10) - estratriene - 3,17β-diol, beige prisms, M.P. 163.8–165.0° C. (corr.), $[\alpha]_D^{25}$ = −8.1° (1% in chloroform).

EXAMPLE 13

*17β-acetoxy-17α-(3-hydroxy-1-propynyl)-3-methoxy-1,3,5(10)-estratriene*

3 - methoxy - 17β - acetoxy - 17α - (3 - acetoxy - 1-propynyl)-1,3,5(10)-estratriene (prepared by refluxing 6.81 g. of 3-methoxy-17α-(3-hydroxy-1-propynyl)-1,3,5(10)-estratriene-17β-ol with acetic anhydride in pyridine) was heated at reflux with a solution of 6 g. of potassium bicarbonate in 180 ml. of methanol for a period of seven days. The reaction mixture was poured into water and the solid product collected by filtration and recrystallized from acetonitrile, using activated charcoal for decolorizing purposes, to give 17β-acetoxy-17α-(3-hydroxy-1-propynyl)-3-methoxy-1,3,5(10)-estratriene, beige blades, M.P. 153.8–154.8° C. (corr.), $[\alpha]_D^{25}$ = −20.4° (1% in chloroform).

EXAMPLE 14

*17α-(3-hydroxy-cis-1-propenyl)-3-methoxy-1,3,5(10)-estratrien-17β-ol*

17α - (3 - hydroxy - 1 - propynyl) - 3 - methoxy - 1,3,5(10)-estratrien-17β-ol (Example 1) (7.40 g.) and 0.50 g. of palladium hydroxide on strontium carbonate catalyst was hydrogened in a Parr apparatus. After eight minutes the required amount of hydrogen had been taken up, the mixture was filtered and the filtrate concentrated in vacuo. The residue was crystallized from ethyl acetate to give 17α-(3 - hydroxy - cis - 1 - propenyl) - 3 - methoxy - 1,3,5(10)-estratrien-17β-ol, colorless needles, M.P. 143.8–145.2° C. (corr.), $[\alpha]_D^{25}$ = +65.0° (1% in chloroform).

17α - (3 - hydroxy - cis - 1 - propenyl) - 3 - methoxy-1,3,5(10)-estratrien-17β-ol with acetic anhydride in pyridine at room temperature gave 17α-(3-acetoxy-cis-1-propenyl) - 3 - methoxy - 1,3,5(10) - estratrien - 77β - ol, M.P. 101.0–103.0° C. (corr.) when recrystallized from acetonitrile; $[\alpha]_D^{25}$ = +70.0° (1% in chloroform).

EXAMPLE 15

*17α-(3-hydroxy-trans-1-propenyl)-3-methoxy-1,3,5(10)-estratrien-17β-ol*

Lithium aluminum hydride (0.78 g.) was added to a solution of 3.40 g. of 17α-(3-hydroxy-1-propynyl)-3-methoxy-1,3,5(10)-estratrien-17β-ol (Example 1), and the mixture was heated at reflux under nitrogen for two and one-half hours. The reaction mixture was allowed to stand at room temperature overnight, 1.6 ml. of water was added dropwise with stirring, and after five hours the mixture was filtered and the filtrate concentrated in vacuo. The residue was recrystallized twice from a tetrahydrofuran-ethyl acetate mixture to give 17α-(3-hydroxy-trans-1-propenyl)-3-methoxy-1,3,5(10)-estratrien-17β-ol, colorless needles, M.P. 180.0°–181.0° C. (corr.); $[\alpha]_D^{25}$ = +38.2° (1% in chloroform).

17α - (3 - hydroxy - trans - 1 - propenyl) - 3 - methoxy-1,3,5(10)-estratrien-17β-ol with acetic anhydride in pyridine at room temperature gave 17α-(3-acetoxy-cis-1-propenyl)-3-methoxy-1,3,5(10)-estratrien-17β-ol, M.P. 85.0–87.0° C. (corr.) when recrystallized from acetonitrile; $[\alpha]_D^{25}$ = +35.7° (1% in chloroform).

I claim:
1. (A) A compound of the formula

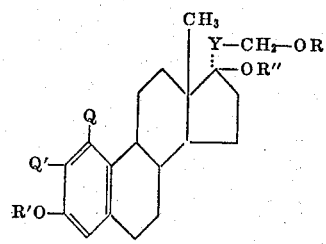

wherein Q is hydrogen or methyl; Q′ is hydrogen, methyl or lower-alkoxy; R and R′ are hydrogen, lower-alkyl, lower-alkenyl, cycloalkyl of 5–6 ring members, phenyl, phenyl-lower-alkyl, phenyl-lower-alkenyl, lower-carboxylic acyl, or nitro; R″ is hydrogen, lower-alkyl, lower-alkenyl, cycloalkyl of 5–6 ring members, phenyl-lower-alkyl, phenyl-lower-alkenyl, lower-carboxylic acyl, or nitro; and Y is C≡C or CH=CH; lower-carboxylic acyl in each instance having 1 to 12 carbon atoms and a molecular weight less than 250; (B) a compound of the above formula having a double bond in the 6,7- 7,8- or 9,11-position; or (C) a compound of the above formula having a double bond in the 6,7-position and a double bond in the 8,9-position.

2. A compound of the formula

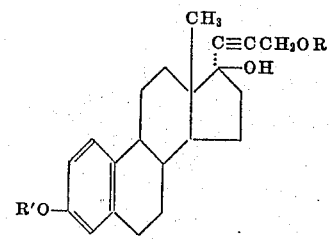

wherein R is lower-carboxylic acyl having from 1 to 12 carbon atoms and a molecular weight less than 250, and R′ is lower-alkyl.

3. A compound of the formula

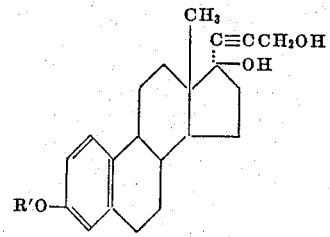

wherein R′ is lower-alkyl.

4. A compound of the formula

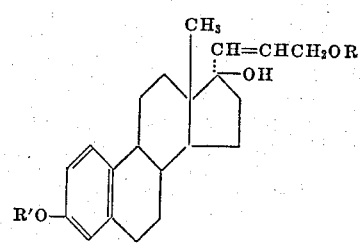

wherein R is lower-carboxylic acyl having from 1 to 12 carbon atoms and a molecular weight less than 250, and R′ is lower-alkyl.

5. A compound of the formula

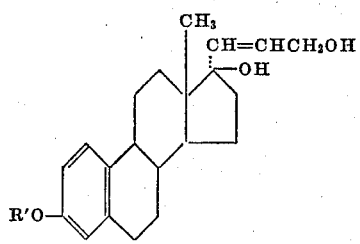

wherein R' is lower-alkyl.

6. 3 - methoxy - 17α - (3 - hydroxy - 1 - propynyl)-1,3,5(10)-estratrien-17β-ol.

7. 3 - methoxy - 17α - (3 - acetoxy - 1 - propynyl)-1,3,5(10)-estratrien-17β-ol.

8. 17α - (3 - hydroxy - 1 - propynyl) - 1,3,5(10)-estratriene-3,17β-diol.

9. 3 - heptyloxy - 17α - (3 - hydroxy - 1 - propynyl)-1,3,5(10)-estratrien-17β-ol.

10. 3 - cyclopentyloxy - 17α - (3 - hydroxy - 1 - propynyl)-1,3,5(10)-estratrien-17β-ol.

11. 3 - methoxy - 17α - (3 - methoxy - 1 - propynyl)-1,3,5(10)-estratrien-17β-ol.

12. 3 - methoxy - 17α - (3 - hydroxy - 1 - propynyl)-1,3,5(10),6-estratetraen-17β-ol.

13. 3 - methoxy - 17α - (3 - hydroxy - 1 - propynyl)-1,3,5(10)-6,8-estrapentaen-17β-ol.

14. 3 - methoxy - 17α - [3 - (3 - phenylpropionyloxy)-1-propynyl]-1,3,5(10)-estratrien-17β-ol.

15. 3 - methoxy - 17α - (3 - propionoxy - 1 - propynyl), 1,3,5(10)-estratrien-17β-ol.

16. 3 - methoxy - 17α - (3 - benzoyloxy - 1 - propynyl)-1,3,5(10)-estratrien-17β-ol.

17. 3 - methoxy - 17α - [3 - (p - methylbenzoyloxy)-1-propynyl]-1,3,5(10)-estratrien-17β-ol.

18. 3 - methoxy - 17α - [3 - (p - fluorobenzoyloxy)-1-propynyl]-1,3,5(10)-estratrien-17β-ol.

References Cited by the Examiner

Arth et al.: "Journal of Medicinal Chemistry," September 1963, pages 617–618 relied on.

LEWIS GOTTS, *Primary Examiner.*

ELBERT L. ROBERTS, *Assistant Examiner.*